Feb. 6, 1923.
1,443,993
E. T. KOSTER.
AUTOMOBILE LAMP AND CIGAR LIGHTER.
FILED JULY 30, 1921.
2 SHEETS-SHEET 2
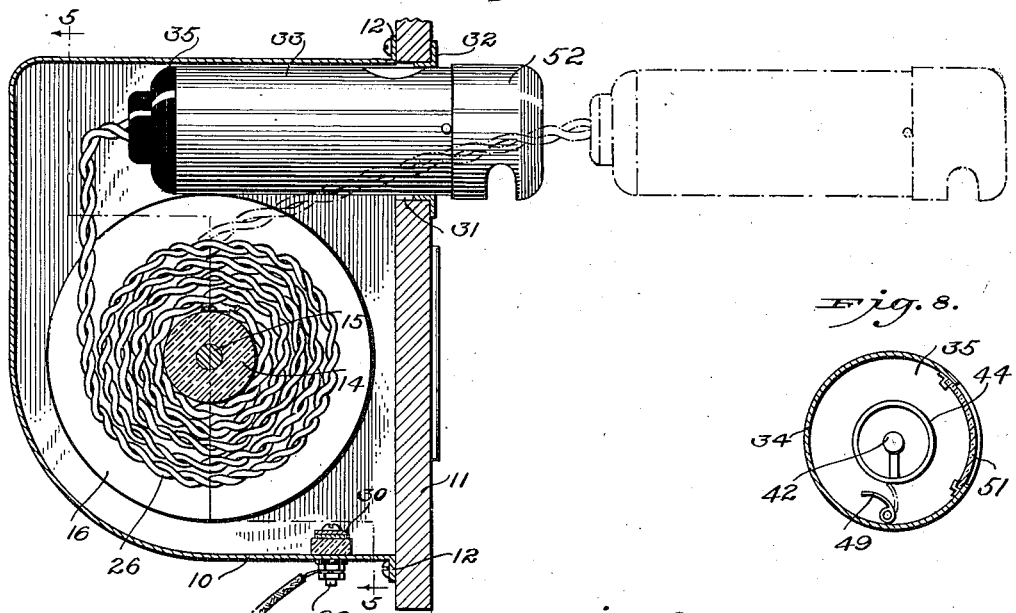
Inventor
EUGENE T. KOSTER
By
George Cook & Sons
Attorneys Patented Feb. 6, 1923.

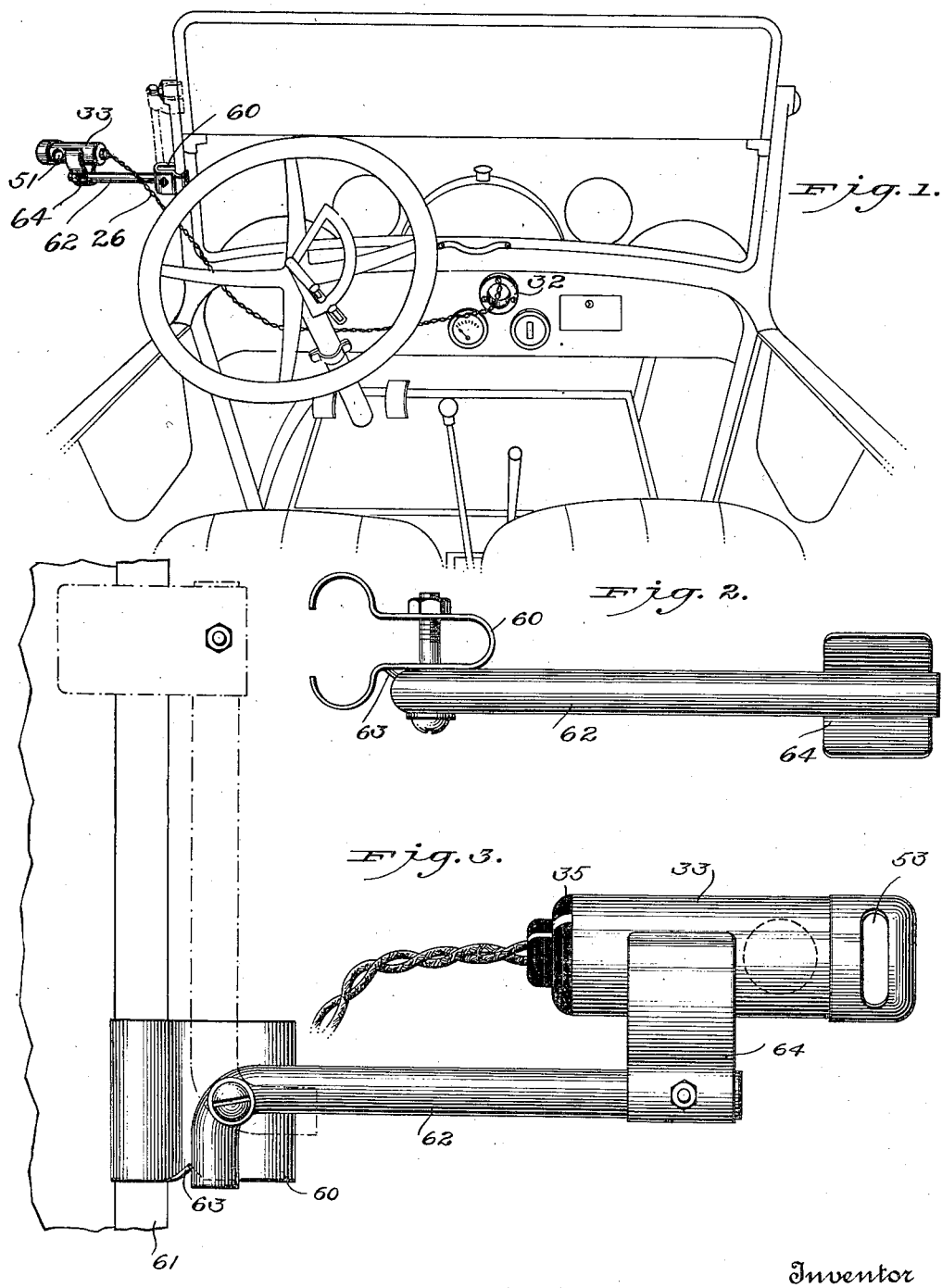

1,443,993

UNITED STATES PATENT OFFICE.

EUGENE T. KOSTER, OF YONKERS, NEW YORK.

AUTOMOBILE LAMP AND CIGAR LIGHTER.

Application filed July 30, 1921. Serial No. 488,660.

*To all whom it may concern:*

Be it known that I, EUGENE T. KOSTER, a citizen of the United States, and a resident of Yonkers, in the county of Westchester and State of New York, have made and invented certain new and useful Improvements in Automobile Lamps and Cigar Lighters, of which the following is a specification.

My invention relates to an automobile accessory and has for its object to provide a device which can be used as a parking light, a dash lamp, a trouble lamp and a cigar lighter.

A further object is to provide a device of the above mentioned character which will be simple in construction, economical to manufacture and of neat and pleasing appearance, and with the foregoing and other objects in view, my invention consists in the improved lamp and cigar lighter, as illustrated in the accompanying drawings and described in the following specification and in such variations and modifications thereof as will be obvious to those skilled in the art to which my invention relates, it being understood that changes may be made within the scope of what is claimed without departing from the spirit of the invention.

The preferred embodiment of my invention is disclosed in the accompanying drawings, wherein:

Figure 1 is a fragmental view in perspective of an automobile equipped with my combined lamp and cigar lighter, the lamp being supported in exposed portion and acting as a parking light.

Figure 2 is a detail view of the bracket for supporting the lamp in position as a parking light.

Figure 3 is a detail view in side elevation of the bracket showing the supporting of the lamp and illustrating by dotted lines the manner in which it is adapted to fold against the windshield or other support.

Figure 4 is a view in vertical longitudinal section of the housing and the accompanying portion of the dash board to which it is secured, and illustrating the lamp in position thereon when acting as a dash lamp and further illustrating by dotted lines, the manner in which the lamp may be withdrawn from the housing for any of its allied uses.

Figure 5 is a view in transverse vertical section taken on line 5—5 of Figure 4.

Figure 6 is an enlarged view of the lamp and illustrating by dotted lines the manner in which the cover of same may be removed.

Figure 7 is a view in vertical longitudinal section of a lamp illustrating the structural details thereof and the electrical circuits employed.

Fig. 8 is a transverse sectional view on line 8—8 of Fig. 7.

Referring specifically to the several views wherein similar reference numerals designate corresponding parts throughout, my novel device is formed with a housing 10 adapted to be secured to the rear of the dash board 11, by suitable flanges and holding members 12. Located within the housing is the winding drum 13 preferably formed with an insulated core 14 through which extends a shaft 15.

Mounted upon the core 14 are flanges 16, 17, there being a suitable torsion spring 18 secured to the first mentioned flange and to the shaft 15. The shaft 15 is provided with a flange or collar 19 in which is located a holding pin 20 fitting within a suitable opening 21 in the side wall of the housing. The remote extremity of the shaft is provided with screw-driver slot 22 and a holding cotter pin 23 so that upon the removal of the latter and the moving of the shaft inward so as to disengage the pin 21 from the opening 20 the tension of the spring 18 can be regulated and the shaft then return to its original and stationary position and so held by the cotter pin 23. A ratchet wheel 24 is secured to the core and cooperates with a pawl 25, the two being so arranged as to allow the winding drum to be locked in adjusted positions or to be forcibly returned to its original position in the manner of the ordinary window shade.

The winding drum contains a flexible electric cord 26 thereon, one strand of which is grounded and accordingly in electrical connection with the grounded binding post 28 while the other strand of the electrical cord is connected to the insulated flange 17 and accordingly in electrical connection with the insulated binding post 29 through the intervention of the brush 30. The two binding posts 28 29 are connected to a source of electrical supply, usually the storage battery of the car.

The dash board 11 is provided with an opening 31 therein, and into which fits the flange socket member 32 and which latter is adapted to receive and properly support the lamp 33, thus when the lamp is in position within the flange 32 it extends into the housing 10 and is accordingly out of the way and shielded against injury.

As will be apparent by referring to Figure 8 the lamp is formed with a metal body or shell 34 and in which is secured the insulated core 35. A button 36 is a screw threaded into the core and protects the ends of the electric cord 37 which latter is wound about and carried by the drum 13.

One terminal of the electric cord 37 is secured to the binding post 38 which is grounded to the body of the lamp 34 by the connection 39. The other of the terminals of the cord 37 are secured to a post 40 which in turn is connected to a rod 41 the remote end of which carries a spring pressed plunger 42, which is adapted to contact with the central terminal of an electric bulb 43. The electric bulb is carried by the usual metal tube 44 having a bayonet joint 45 in the front end whereby the bulb is held in place and in contact with the plunger 42.

A lens 46 is mounted in the front end of the body of the lamp and is adapted to project the rays of light in a forward or longitudinal direction, the lens being held in place by suitable spring ring 47. A switch handle 48 extends through the metallic shell or body 34 of the lamp and is grounded thereto and provided at its remote extremity with the contact arm 49. The arm 49 is so arranged that upon the turning of the switch handle 48 it will come in contact with the tube 44 of the lamp and ground the same allowing the electric energy to flow through the bulb and illuminate the same.

The body of the lamp is provided with a window 50 extending through the side wall thereof, and in which window or opening is provided the member 51 through which the rays of light upon passing appear red. This window opening is directly to the side of the bulb and is capable of showing a red light in the rear of the car when the lamp is acting as a parking light.

A cap 52 is slideably mounted upon the front extremity of the lamp and is provided with a side window or opening 53 and is accordingly adapted to direct the rays of light in a transverse direction so that when the lamp is being used as a dash light as illustrated in Figure 4 the rays of light from the bulb will pass transversely through the slot or window 53 and accordingly illuminate the front compartment of the car. This cap is also used when the lamp is being used as a parking light, the cap being rotated so that slot or window 53 will come opposite the red member 51 so that a white light will be visible in front and red light in the rear.

I have found that the lamp being portable so that it may be used as a dash lamp or a parking lamp renders it also ideal for use as a trouble lamp, and particularly so due to the fact that the cap 52 may be removed whereby the lamp is adapted to throw a powerful beam of light in a forward or longitudinal direction, the cord upon the winding drum being made of sufficient length so that all parts of the car may be rendered accessible. This portable feature of the lamp also lends itself to the use of a cigar lighter and to this end the metallic shell 34 and insulated core 35 are cut away as at 54 and a heating resistance element 55 secured in place with the one terminal 56 communicating with the electric conductor 41 and the remote terminal 57 arranged in the path of the grounded button 58 the latter being carried by a suitable spring 59 so that when the button 58 is pressed the heating element will be brought into circuit with the terminals 38, 40 of the electric cord and the heating element accordingly energized and capable of lighting a cigarette or cigar.

In order to provide that the lamp may be conveniently supported for use as a parking light, I have provided a bracket as illustrated in Figures 1, 2 and 3 which is composed of a clamp 60 which is adapted to engage the upright standard 61 of a windshield and pivotally support an arm 62. The clamp is provided with a lug 63 limiting the movement of the arm in one direction to a substantially horizontal position but allowing the arm to swing upward into the dotted position as illustrated in Figure 3 whereupon a second clamp 64 which is carried at the outer extremity of the arm 62 is adapted to engage a portion of the windshield 61 and thus hold the arm up out of the way.

The clamp 64 is so designed as to detachably receive the portable lamp therein and thus hold it into position as illustrated in Figure 1 whereupon the lamp forms an ideal parking light.

In this connection I wish to call attention to the fact that switch 48 button 58 and cigar lighter 55 are so positioned with respect to the red lens of the lamp that when the lamp is in use as a parking light the switch, button and cigar lighter will occupy the lowermost position of the lamp and are accordingly protected from the weather and thus prevent the entrance of rain or moisture into the interior of the lamp.

Having thus fully described my invention, what I claim is:

1. An article of the class described comprising a winding drum with an electric cord thereon, an electric lamp attached to said electric cord, means for supporting said lamp as a parking light and for disclosing a white light to the front and a red light to the rear, and means for supporting said lamp as a dash light.

2. An article of the class described comprising a housing adapted to be secured to the dash board of an automobile, a winding drum with an electric cord thereon, mounted within said housing, an electric lamp connected to said cord and adapted to be supported by said housing and act as a dash lamp, said lamp provided with means for exposing red light in one direction and a white light in the opposite direction and means for mounting said lamp as a parking light.

3. A device of the class described comprising an electric lamp, a flexible electric cord attached to the same and retractably carried by a housing, said lamp provided with a red filter and with a cap having an opening therein, said opening and red filter adapted to display a red light in one direction and a white light in the opposite direction, means for mounting said lamp as a parking light, said lamp adapted to seat within housing and act as a dash lamp, said cap adapted to be removed allowing the lamp to be used as a trouble light.

4. In a device of the class described the combination of a housing, a retractable winding drum therein, a flexible electric cord carried by said drum, a portable lamp connected to said electric cord, means for supporting said lamp as a dash light, means for supporting said lamp as a parking light, said lamp provided with means for exposing a red light in a rearward direction and a white light in a forward direction, a removable cap carried by said lamp, said lamp adapted to project a white light in a longitudinal direction upon the removal of said cap, and a switch carried by said lamp controlling the electric circuit thereof.

5. In a device of the class described the combination of a housing, a retractable winding drum therein, a flexible electric cord carried by said drum, a portable lamp connected to said electric cord, means for supporting said lamp as a dash light, means for supporting said lamp as a parking light, said lamp provided with means for exposing a red light in a rearward direction and a white light in a forward direction, a removable cap carried by said lamp, said lamp adapted to project a white light in a longitudinal direction upon the removal of said cap, and a switch carried by said lamp controlling the electric circuit thereof, and a heating element carried by said lamp and adapted to act as a cigar lighter.

6. In a device of the class described the combination of a housing, a retractable winding drum therein, a flexible electric cord carried by said drum, a portable lamp connected to said electric cord, means for supporting said lamp as a dash light, means for supporting said lamp as a parking light, said lamp provided with means for exposing a red light in a rearward direction and a white light in a forward direction, a removable cap carried by said lamp, said lamp adapted to project a white light in a longitudinal direction upon the removal of said cap, and a switch carried by said lamp controlling the electric circuit thereof, and a heating element carried by said lamp and adapted to act as a cigar lighter, and a spring switch controlling the electric circuit of said cigar lighter.

7. An apparatus of the class described comprising a portable electric lamp, said lamp provided with means for exposing a red light in one direction and a white light in the opposite direction, means for mounting the same as a dash lamp and a swinging arm adapted to fold into an upright position adapted to swing into a horizontal position and means carried by said arm adapted to support the portable lamp for display as a parking lamp with the red light displayed to the rear of the car and the white light to the front of the car.

8. An automobile light of the class described comprising an extensible and retractable electric cord, an electric lamp attached to said electric cord, means for mounting said electric lamp as a dash lamp, said means allowing said lamp to be removed therefrom to act as a portable trouble lamp, said lamp including a body having a switch thereon controlling the electric circuit of the illuminator, a cigar lighter carried by said lamp and electrically connected to said electric cord, a switch controlling the electric circuit of said cigar lighter, means associated with said body and the illuminator whereby red light is projected in one direction and white light in the opposite direction, and supporting means whereby said lamp may be mounted as a parking light with the red light visible to the rear of the car and the white light visible to the front of the car.

Signed at New York, borough of Manhattan, in the county of New York and State of New York.

EUGENE T. KOSTER.

Witnesses:
 RUTH COHEN,
 RICHARD T. O'LEARY.